United States Patent
Blunier et al.

(10) Patent No.: US 10,426,072 B2
(45) Date of Patent: *Oct. 1, 2019

(54) TOOL BAR MOUNTING ASSEMBLY FOR AN AGRICULTURAL IMPLEMENT

(71) Applicant: CNH Industrial America LLC, New Holland, PA (US)

(72) Inventors: Timothy R. Blunier, Danvers, IL (US); Brian McMahon, Deer Creek, IL (US)

(73) Assignee: CNH Industrial America LLC, New Holland, PA (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/730,327

(22) Filed: Oct. 11, 2017

(65) Prior Publication Data

US 2018/0027724 A1   Feb. 1, 2018

Related U.S. Application Data

(62) Division of application No. 14/703,539, filed on May 4, 2015, now Pat. No. 9,854,722, which is a division
(Continued)

(51) Int. Cl.
  *A01B 51/04* (2006.01)
  *A01B 59/04* (2006.01)
(Continued)

(52) U.S. Cl.
  CPC ............ *A01B 51/04* (2013.01); *A01B 59/048* (2013.01); *A01B 73/02* (2013.01); *A01C 23/008* (2013.01); *Y02P 60/214* (2015.11)

(58) Field of Classification Search
  CPC ....... A01B 51/04; A01B 51/00; A01B 59/048; A01B 59/04; A01B 59/00; A01B 73/02; A01B 73/00; A01C 23/008; Y02P 60/214; Y02P 60/212; Y02P 60/21; Y02P 60/20; Y02P 60/00
  USPC ....... 172/311, 456, 776, 439, 443, 446, 679, 172/451, 662, 310, 47, 248, 741; 111/118–129
  See application file for complete search history.

(56) References Cited

U.S. PATENT DOCUMENTS 3,921,726 A   11/1975   Conner et al.
3,951,214 A   4/1976   Ramsower
(Continued)

*Primary Examiner* — Christopher J. Novosad
(74) *Attorney, Agent, or Firm* — Rebecca L. Henkel; Rickard K. DeMille

(57) ABSTRACT

A tool bar mounting assembly for an agricultural implement. One agricultural implement includes a first tool bar assembly having a tool bar and a plurality of row units coupled to the tool bar and configured to deliver flowable agricultural product to a field. The agricultural implement also includes a frame assembly coupled to the first tool bar assembly. The frame assembly includes a mounting assembly having a mechanical linkage. The mechanical linkage is configured to removably couple the first tool bar assembly to the frame assembly via a plurality of fasteners. The frame assembly is configured to provide structural support to the first tool bar assembly. The mechanical linkage of mounting assembly is configured to removably couple a second tool bar assembly having a different configuration than the first tool bar assembly to the frame assembly via the plurality of fasteners.

20 Claims, 5 Drawing Sheets

Related U.S. Application Data of application No. 13/604,696, filed on Sep. 6, 2012, now Pat. No. 9,021,968.

(51) Int. Cl.
    *A01B 73/02*     (2006.01)
    *A01C 23/00*     (2006.01)
    *A01B 59/048*     (2006.01)

(56) References Cited

U.S. PATENT DOCUMENTS

| | | |
|---|---|---|
| 4,195,860 A | 4/1980 | Helams |
| 4,198,074 A | 4/1980 | Ishiguro |
| 4,350,211 A | 9/1982 | Coufal |
| 4,502,545 A | 3/1985 | Couser |
| 5,707,170 A | 1/1998 | Wattonville |
| 5,762,436 A | 6/1998 | Mosdal |
| 6,758,284 B2 | 7/2004 | Myers |
| 6,935,435 B1 | 8/2005 | Shenk |
| 8,006,775 B2 | 8/2011 | Steinlage et al. |
| 8,079,425 B1 | 12/2011 | Van Kooten et al. |
| 9,021,968 B2 | 5/2015 | Blunier et al. |
| 9,854,722 B2 * | 1/2018 | Blunier ............... A01B 59/048 |
| 2010/0205922 A1 | 8/2010 | Pierson |
| 2011/0315411 A1 | 12/2011 | Adams et al. |
| 2012/0006605 A1 | 1/2012 | Warachka |

\* cited by examiner

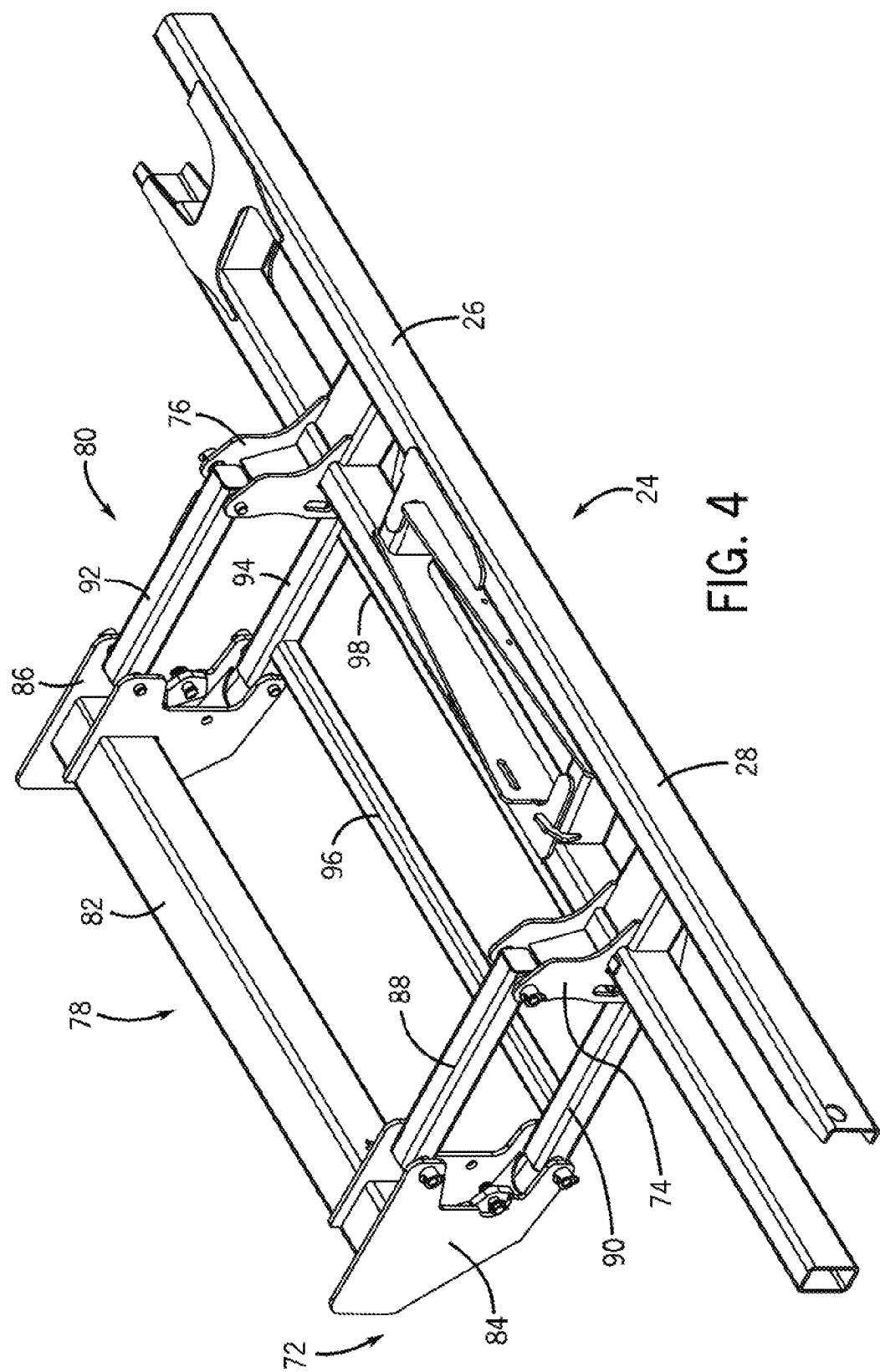

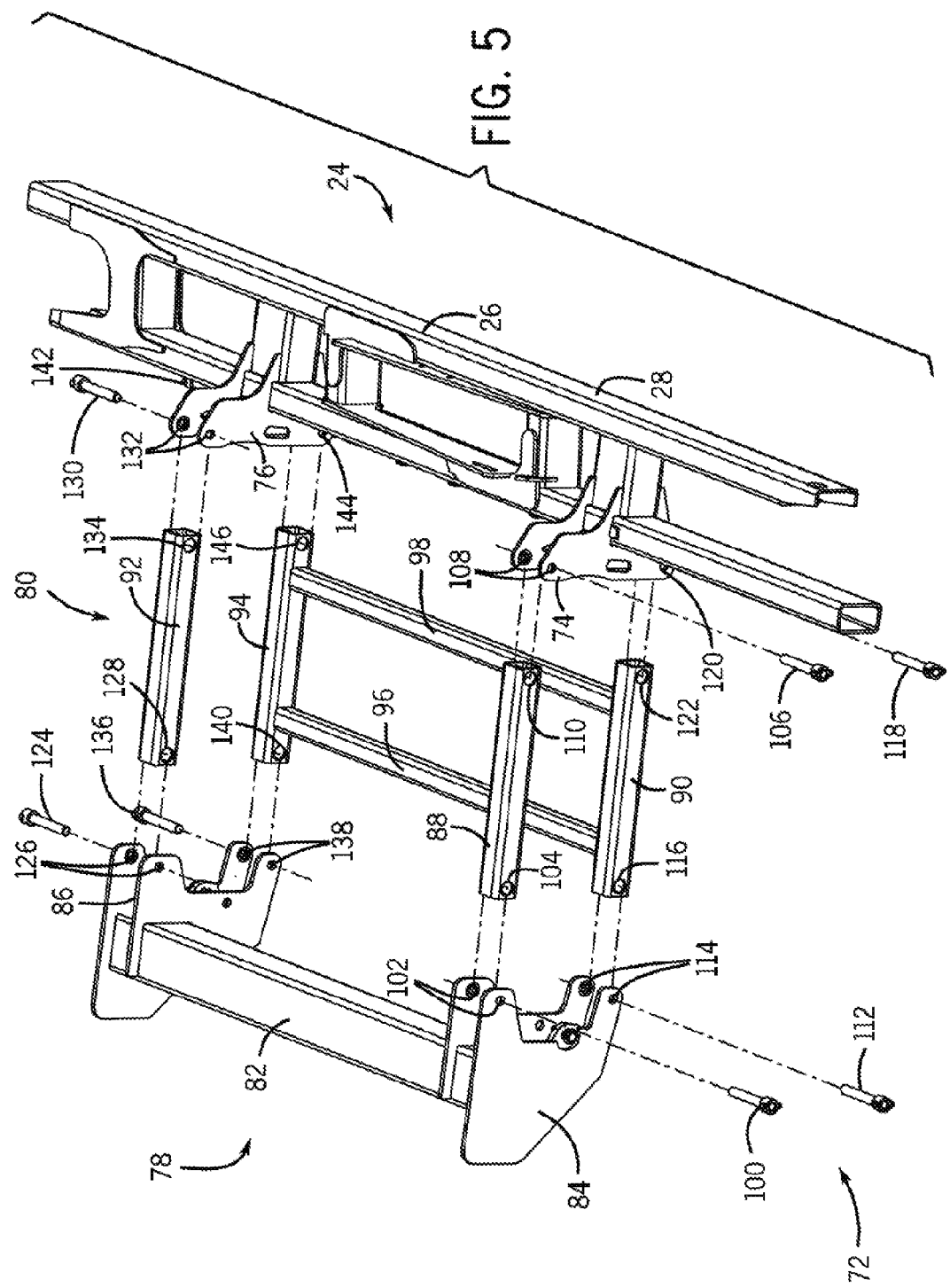

TOOL BAR MOUNTING ASSEMBLY FOR AN AGRICULTURAL IMPLEMENT

CROSS-REFERENCE TO RELATED APPLICATIONS

This application is a divisional of U.S. patent application Ser. No. 14/703,539, entitled "TOOL BAR MOUNTING ASSEMBLY FOR AN AGRICULTURAL IMPLEMENT", filed May 4, 2015, which is a divisional of U.S. patent application Ser. No. 13/604,696, entitled "TOOL BAR MOUNTING ASSEMBLY FOR AN AGRICULTURAL IMPLEMENT", filed Sep. 6, 2012, now U.S. Pat. No. 9,021,968. Each of the foregoing applications is herein incorporated by reference in its entirety.

BACKGROUND

The invention relates generally to ground working equipment, such as agricultural equipment, and more specifically, to a tool bar mounting assembly for an agricultural implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of the injection nozzles, to flow the liquid fertilizer into respective trenches formed by the openers and the knives. Using such implements, fertilizer may be distributed throughout a field, either before or after planting, to facilitate enhanced crop development.

A fertilizer application implement may include a tool bar assembly having a tool bar. One or more ground engaging tools may be attached to the tool bar at a spacing based on row spacing of crops. In some configurations, the spacing between the ground engaging tools may be fixed, while in other configurations the spacing between the ground engaging tools may be variable. In configurations in which the spacing between the ground engaging tools is variable, it may be time consuming to adjust the ground engaging tool spacing. Furthermore, portions of the tool bar (e.g., structural members, mounts, etc.) may interfere with certain ground engaging tool spacing.

Moreover, in some fertilizer application implements, the tool bar may be welded to a frame of the implement for structural support and/or stability. A current trend for fertilizer application implements, and other implements, is to increase the length of the tool bar to increase the swath of soil covered by the implement. Increasing the length of the tool bar of may facilitate distribution of fertilizer throughout a field at a faster rate. Unfortunately, it may be difficult, time consuming, and/or expensive to increase the length of a tool bar or to change the row spacing of the ground engaging tools attached to the tool bar (e.g., multiple implements of different configurations may be used).

BRIEF DESCRIPTION

In one embodiment, an agricultural implement includes a first tool bar assembly having a tool bar and a plurality of row units coupled to the tool bar and configured to deliver flowable agricultural product to a field. The agricultural implement also includes a frame assembly coupled to the first tool bar assembly. The frame assembly includes a mounting assembly having a mechanical linkage. The mechanical linkage is configured to removably couple the first tool bar assembly to the frame assembly via a plurality of fasteners. The frame assembly is configured to provide structural support to the first tool bar assembly. The mechanical linkage of the mounting assembly is configured to removably couple a second tool bar assembly having a different configuration than the first tool bar assembly to the frame assembly via the plurality of fasteners.

In another embodiment, an agricultural implement includes a first tool bar assembly having a tool bar and a frame assembly coupled to the first tool bar assembly. The frame assembly includes a mounting assembly having a parallel linkage. The parallel linkage is configured to removably couple the first tool bar assembly to the frame assembly. The frame assembly is configured to provide structural support to the first tool bar assembly. The parallel linkage of the mounting assembly is configured to removably couple a second tool bar assembly having a different configuration than the first tool bar assembly to the frame assembly.

In a further embodiment, an agricultural implement includes a frame assembly having a mounting assembly having a four-bar linkage. The four-bar linkage is configured to removably couple a first tool bar assembly to the frame assembly via a plurality of fasteners. The frame assembly is configured to provide structural support to the first tool bar assembly. The four-bar linkage of the mounting assembly is configured to removably couple a second tool bar assembly having a different configuration than the first tool bar assembly to the frame assembly via the plurality of fasteners.

DRAWINGS

These and other features, aspects, and advantages of the present invention will become better understood when the following detailed description is read with reference to the accompanying drawings in which like characters represent like parts throughout the drawings, wherein:

FIG. 4 is a perspective view of an embodiment of a tool bar mounting assembly; and FIG. 5 is an exploded view of the tool bar mounting assembly of FIG. 4.

DETAILED DESCRIPTION

Figure 1:
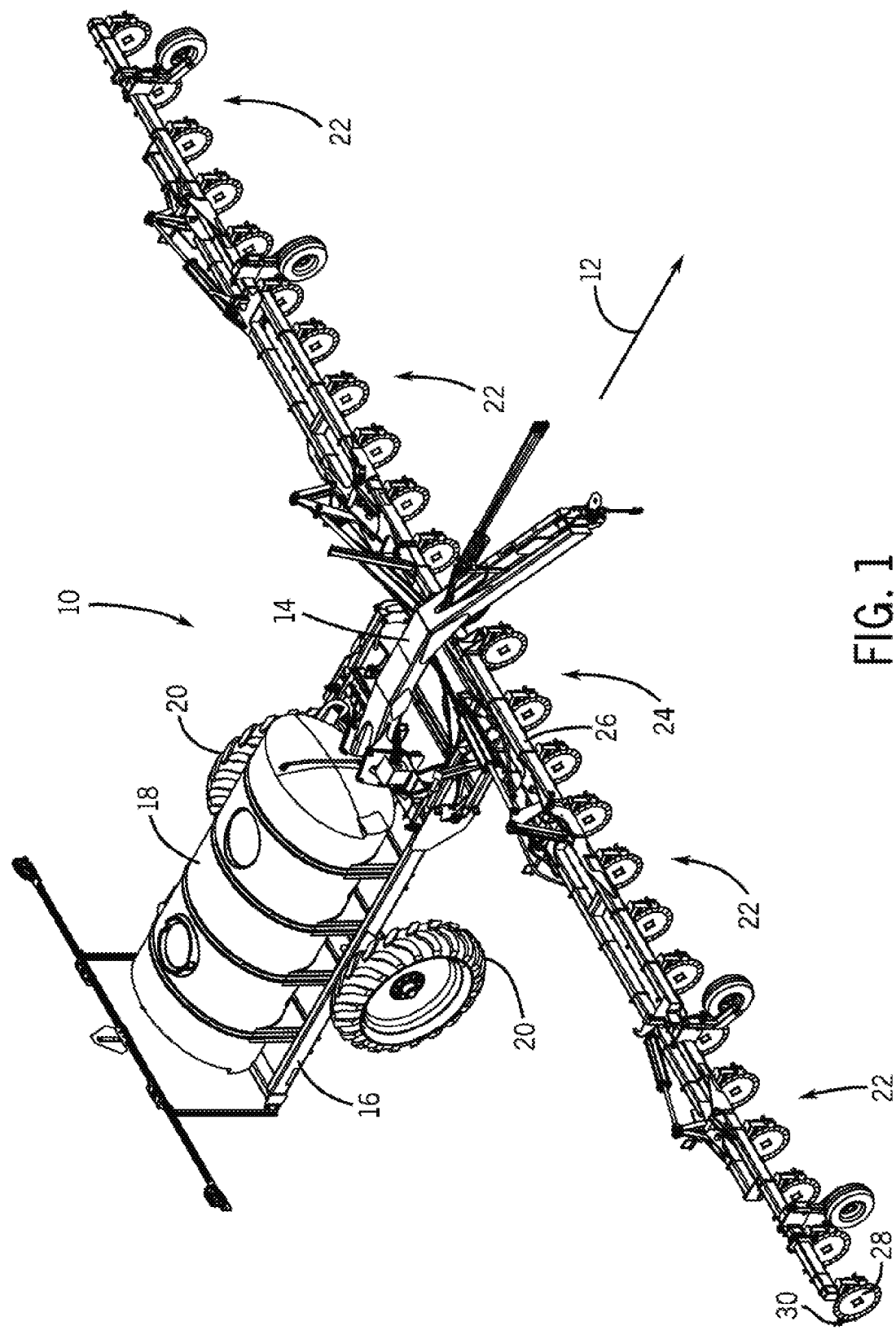
FIG. 1 is a perspective view of an embodiment of an agricultural implement having an interchangeable tool bar.

FIG. 1 is a perspective view of an embodiment of an agricultural implement 10 having an interchangeable tool bar. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a frame assembly 16 of the implement 10 to facilitate towing of the implement 10 in the direction of travel 12. In the illustrated embodiment, the frame assembly 16 supports a storage tank 18 configured to house a flowable agricultural product, such as liquid fertilizer. A pair of wheels 20 coupled to the frame assembly 16 is configured to support the weight of the frame assembly 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24 having a tool bar 26. Each row unit 22 includes a ground engaging tool 28 configured to break the soil, thereby excavating a trench into the soil. An injection nozzle or knife 30 (e.g., positioned behind the ground engaging tool 28) is configured to deposit flowable agricultural product from the storage tank 18 into the trench formed by the ground engaging tool 28. In certain embodiments, the penetration depth of the ground engaging tools 28 is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., at the approximate midpoint between rows), thereby facilitating enhanced crop development. In addition, the implement 10 may be utilized to apply fertilizer to previously planted seeds (e.g., via injecting fertilizer between rows of the previously planted seeds).

The frame assembly 16 may include a mounting assembly configured to be coupled to multiple configurations of tool bar assemblies 24 (e.g., tool bar assemblies 24 having different lengths, different numbers of sections, and/or different spacing of ground engaging tools 28). Accordingly, the frame assembly 16 may enable the agricultural implement 10 to be modularized. For example, the frame assembly 16 may facilitate removal and replacement of tool bar assemblies 24 having different dimensions. Such removal and replacement of tool bar assemblies 24 may be performed quickly and easily due to the modularization. Therefore, the agricultural implement 10 may accommodate different tool bar assemblies 24. Thus, the modularized implement may obviate the acquisition of multiple implements to accommodate varying field configurations, thereby reducing fertilization costs.

Figure 2:
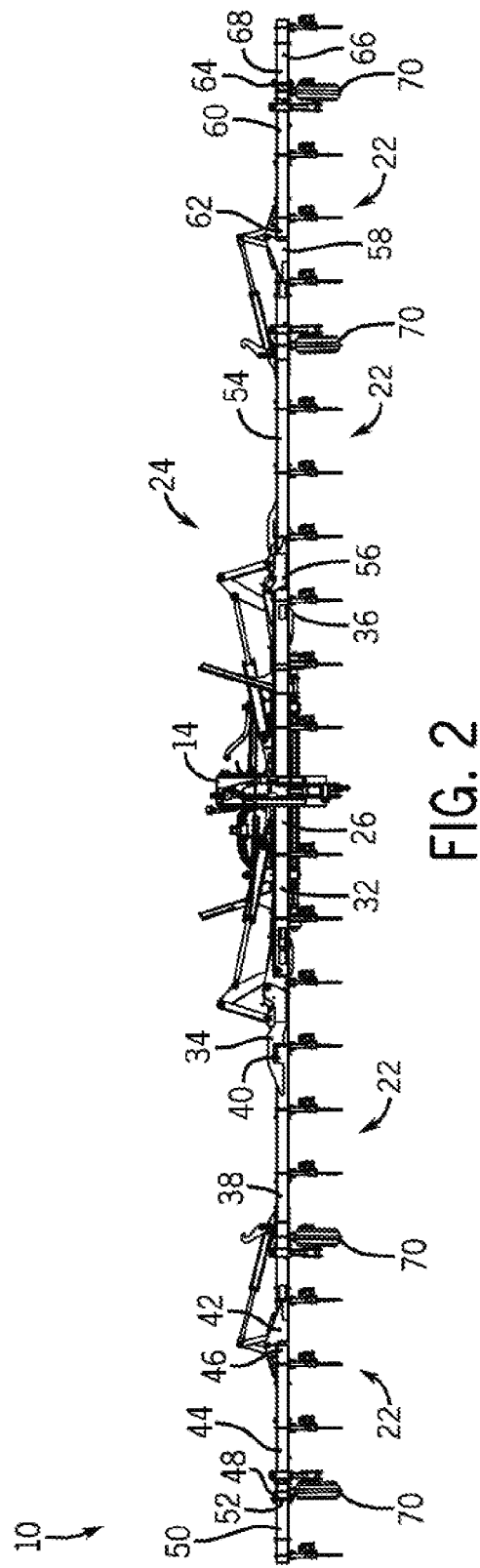
FIG. 2 is a front view of the agricultural implement of FIG. 1.

FIG. 2 is a front view of the agricultural implement 10 of FIG. 1. As illustrated, the tool bar 26 includes a central section and four wing sections. Specifically, the tool bar 26 includes a central tool bar 32 having a first end 34 and a second end 36. The first end 34 of the central tool bar 32 is rotatably coupled to a first wing tool bar 38. The first wing tool bar 38 includes a first end 40 and a second end 42. As illustrated, the first end 34 of the central tool bar 32 is rotatably coupled to the first end 40 of the first wing tool bar 38. Moreover, the second end 42 of the first wing tool bar 38 is rotatably coupled to a second wing tool bar 44. The second wing tool bar 44 also includes a first end 46 and a second end 48. The second end 42 of the first wing tool bar 38 is rotatably coupled to the first end 46 of the second wing tool bar 44. The second end 48 of the second wing tool bar 44 is coupled to a first tool bar extension 50. Specifically, the second end 48 of the second wing tool bar 44 is coupled to an end 52 of the first tool bar extension 50.

The second end 36 of the central tool bar 32 is rotatably coupled to a third wing tool bar 54. The third wing tool bar 54 includes a first end 56 and a second end 58. As illustrated, the second end 36 of the central tool bar 32 is rotatably coupled to the first end 56 of the third wing tool bar 54. Moreover, the second end 58 of the third wing tool bar 54 is rotatably coupled to a fourth wing tool bar 60. The fourth wing tool bar 60 also includes a first end 62 and a second end 64. The second end 58 of the third wing tool bar 54 is rotatably coupled to the first end 62 of the fourth wing tool bar 60. The second end 64 of the fourth wing tool bar 60 is rigidly coupled to a second tool bar extension 66. Specifically, the second end 64 of the fourth wing tool bar 60 is rigidly and non-rotatably coupled to an end 68 of the second tool bar extension 66.

While the tool bar 26 of the present embodiment includes five sections, in other embodiments, the tool bar 26 may include any suitable number of sections (e.g., one or more). As may be appreciated, depending on the number of sections of the tool bar 26, any of the ends 34, 36, 42, 48, 58, and 64 of the tool bars may be considered distal ends of the tool bar 26. As illustrated, wheel assemblies 70 are coupled to the tool bar 26 to facilitate movement of the agricultural implement 10 through a field. Specifically, wheel assemblies 70 are coupled to the first wing tool bar 38, to the second wing tool bar 44, to the third wing tool bar 54, and to the fourth wing tool bar 60. However, wheel assemblies 70 (e.g., wheels) may not be coupled to the tool bar extensions 50 and 66. In the illustrated embodiment, the agricultural implement 10 facilitates removal and replacement of tool bar assemblies 24 having different lengths and/or numbers of wing sections. Such removal and replacement of tool bar assemblies 24 may be performed quickly and easily due to the design of the tool bar mounting assembly, as explained in detail below.

Figure 3:
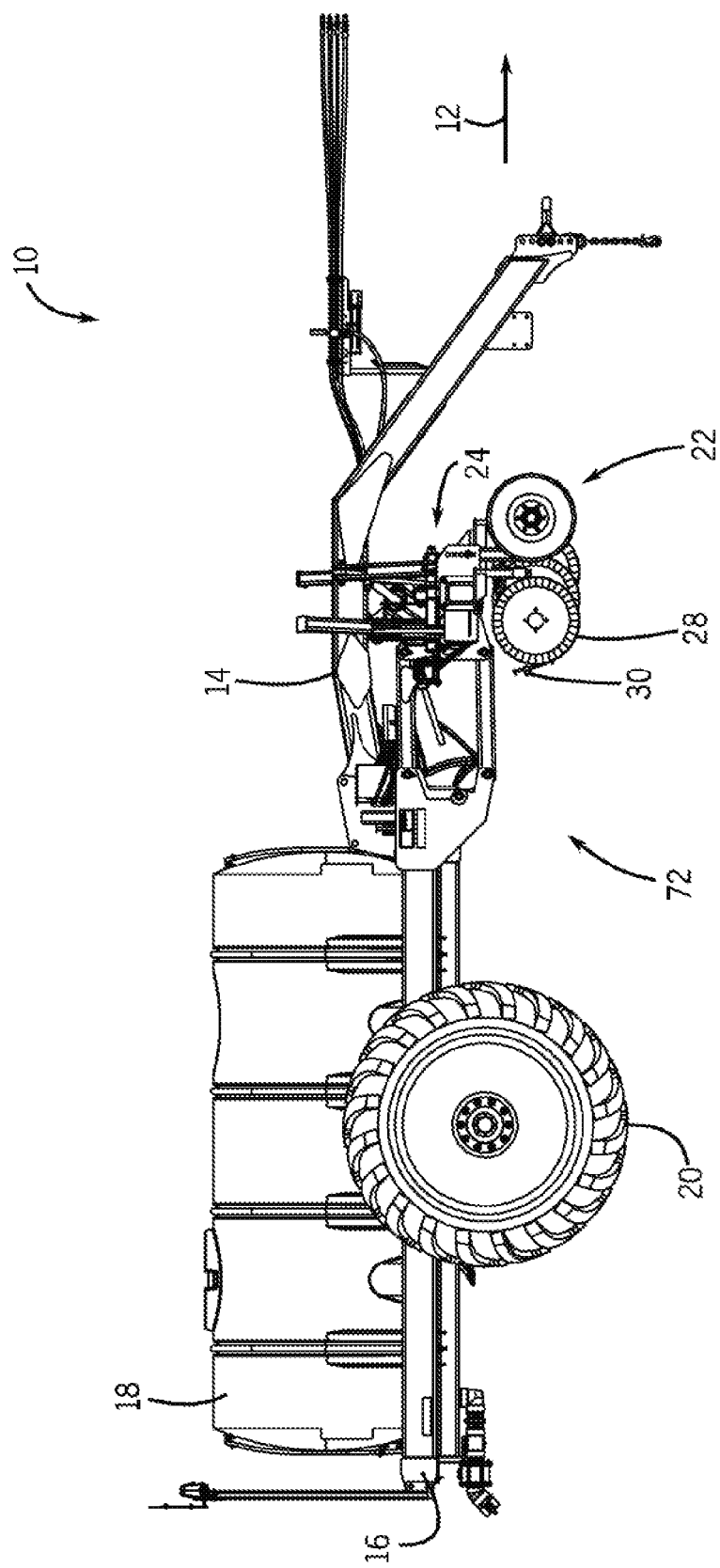
FIG. 3 is a side view of the agricultural implement of FIG. 1, illustrating an embodiment of a tool bar mounting assembly.

FIG. 3 is a side view of the agricultural implement 10 of FIG. 1, illustrating an embodiment of a tool bar mounting assembly. As discussed previously, the agricultural implement 10 includes multiple row units 22. Each of the row units 22 includes the ground engaging tool 28 configured to break the soil, thereby excavating a trench into the soil. Further, each of the row units 22 includes the injection nozzle 30, which is positioned behind the ground engaging tool 28, and configured to deposit the flowable agricultural product from the storage tank 18 into the trench formed by the ground engaging tool 28. Accordingly, a flowable agricultural product may be distributed throughout a field to facilitate enhanced crop development. The frame assembly 16 includes a mounting assembly 72 for mounting the tool bar assembly 24 to the agricultural implement 10 in a modularized fashion. Accordingly, tool bar assemblies 24 may be quickly and easily removed and/or replaced.

FIG. 4 is a perspective view of an embodiment of the tool bar mounting assembly 72. As illustrated, mounting bracket assemblies 74 and 76 are coupled to the tool bar assembly 24 to facilitate mounting of the tool bar assembly 24 to the tool bar mounting assembly 72. The tool bar mounting assembly 72 includes a support portion 78 and a mechanical linkage assembly 80, such as the illustrated four-bar parallel linkage assembly. The support portion 78 is configured to be coupled to the frame assembly 16 of the agricultural implement 10. Moreover, the support portion 78 includes a crossbar 82 that extends laterally between mounting bracket assemblies 84 and 86. As such, the support portion 78 may provide structural stability to an attached tool bar assembly 24.

The mechanical linkage assembly 80 extends between the support portion 78 and the tool bar assembly 24 to facilitate substantially vertical movement of the tool bar assembly 24. Accordingly, the mechanical linkage assembly 80 is rotatably attached to the support portion 78 and to the tool bar assembly 24. The mechanical linkage assembly 80 includes a first bar 88 and a second bar 90 on one side of the mounting assembly 72, which form a first four-bar linkage. Further, the mechanical linkage assembly 80 includes a third bar 92 and a fourth bar 94 on the opposite lateral side of the mounting assembly 72, which form a second four-bar linkage. A first crossbar 96 and a second crossbar 98 extend laterally between the second bar 90 and the fourth bar 94 to couple the second bar 90 to the fourth bar 94. In the illustrated embodiment, the first bar 88 and the third bar 92 are not connected to one another. Accordingly, the first bar 88 and the third bar 92 may move independently to facilitate coupling the mechanical linkage assembly 80 to the tool bar assembly 24.

While the present embodiment of the mounting assembly 72 includes the support portion 78 and the mechanical linkage assembly 80, other embodiments of the mounting assembly 72 may include different types and/or configurations of mounting structures. For example, certain embodiments of mounting assemblies 72 may include only a support structure or only a mechanical linkage. As illustrated, the mechanical linkage assembly 80 is coupled to both the support portion 78 and to the tool bar assembly 24 via fasteners (e.g., bolts, pins, etc.). This connection facilitates quick and easy removal of the mechanical linkage assembly 80 from the support portion 78 and/or removal of the tool bar assembly 24 from the mechanical linkage assembly 80. Accordingly, a tool bar assembly having a different length, row unit spacing, number of wings, and/or other configuration may replace the tool bar assembly 24. Thus, the illustrated agricultural implement 10 may obviate the acquisition of multiple implements to accommodate varying field configurations, thereby reducing fertilization costs.

FIG. 5 is an exploded view of the tool bar mounting assembly 72 of FIG. 4. In the illustrated embodiment, the first bar 88 of the mechanical linkage assembly 80 is rotatably coupled to the mounting bracket assembly 84 of the support portion 78 using a fastener 100. Specifically, the fastener 100 is inserted through openings 102 in the mounting bracket assembly 84 and openings 104 in the first bar 88 to secure the first bar 88 to the mounting bracket assembly 84. Moreover, the first bar 88 may be coupled to the mounting bracket assembly 74 of the tool bar assembly 24 using a fastener 106. Specifically, the fastener 106 is inserted through openings 108 in the mounting bracket assembly 74 and openings 110 in the first bar 88 to secure the first bar 88 to the mounting bracket assembly 74.

Further, the second bar 90 of the mechanical linkage assembly 80 is rotatably coupled to the mounting bracket assembly 84 of the support portion 78 using a fastener 112. Specifically, the fastener 112 is inserted through openings 114 in the mounting bracket assembly 84 and openings 116 in the second bar 90 to secure the second bar 90 to the mounting bracket assembly 84. Moreover, the second bar 90 may be coupled to the mounting bracket assembly 74 of the tool bar assembly 24 using a fastener 118. Specifically, the fastener 118 is inserted through openings 120 in the mounting bracket assembly 74 and openings 122 in the second bar 90 to secure the second bar 90 to the mounting bracket assembly 74.

As illustrated, the third bar 92 of the mechanical linkage assembly 80 is rotatably coupled to the mounting bracket assembly 86 of the support portion 78 using a fastener 124. Specifically, the fastener 124 is inserted through openings 126 in the mounting bracket assembly 86 and openings 128 in the third bar 92 to secure the third bar 92 to the mounting bracket assembly 86. Moreover, the third bar 92 may be coupled to the mounting bracket assembly 76 of the tool bar assembly 24 using a fastener 130. Specifically, the fastener 130 is inserted through openings 132 in the mounting bracket assembly 76 and openings 134 in the third bar 92 to secure the third bar 92 to the mounting bracket assembly 76.

Further, the fourth bar 94 of the mechanical linkage assembly 80 is rotatably coupled to the mounting bracket assembly 86 of the support portion 78 using a fastener 136. Specifically, the fastener 136 is inserted through openings 138 in the mounting bracket assembly 86 and openings 140 in the fourth bar 94 to secure the fourth bar 94 to the mounting bracket assembly 86. Moreover, the fourth bar 94 may be coupled to the mounting bracket assembly 76 of the tool bar assembly 24 using a fastener 142. Specifically, the fastener 142 is inserted through openings 144 in the mounting bracket assembly 76 and openings 146 in the fourth bar 94 to secure the fourth bar 94 to the mounting bracket assembly 76. It should be noted that the fasteners 100, 106, 112, 118, 124, 130, 136, and 142 may be any suitable fastening device, such as bolts, screws, pins, etc.

As may be appreciated, tool bar assemblies 24 may have different lengths and/or numbers of wing sections to distribute flowable agricultural product to different sized swaths of a field. Further, tool bar assemblies 24 may have row units with different spacing to accommodate the spacing of rows in a field. While row units 22 of an agricultural implement 10 may be adjustable, it may be time consuming to adjust the spacing of the row units 22 to accommodate areas with different row spacing. Moreover, certain spacing of the row units 22 may interfere with the mounting or structural portions of the tool bar assembly 24. For example, movement of the row units 22 may be limited by mounting or structural portions of the tool bar assembly 24. As described herein, the frame assembly 16 includes the mounting assembly 72 to facilitate modularization (e.g., faster connection, easier connection, etc.). Accordingly, tool bar assemblies 24 of different lengths, different numbers of wing sections, and/or different spacing of the row units 22 may be attached to the frame assembly 16. As such, a single agricultural implement 10 having various configurations may be used to apply fertilizer to fields. Therefore, the modularized agricultural implement 10 may be used in place of multiple agricultural implements that are not modularized, thereby decreasing costs.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An agricultural implement, comprising:
 a frame assembly comprising a mounting assembly having a four-bar linkage, wherein the four-bar linkage comprises a first bar, a second bar, a third bar, and a fourth bar, the first bar and the second bar are laterally aligned with one another, the third bar and the fourth bar are laterally aligned with one another, the first bar and the second bar are configured to directly engage a first bracket assembly of a first tool bar assembly via a first plurality of fasteners to removably couple the first bracket assembly of the first tool bar assembly to the frame assembly, the third bar and the fourth bar are configured to directly engage a second bracket assembly of the first tool bar assembly via a second plurality of fasteners to removably couple the second bracket assembly of the first tool bar assembly to the frame assembly, the frame assembly is configured to provide structural support to the first tool bar assembly, the four-bar linkage of the mounting assembly is configured to facilitate removal and replacement of the first tool bar assembly with a second tool bar assembly having a different configuration than the first tool bar assembly, the first bar and the second bar are configured to directly engage a first bracket assembly of the second tool bar assembly via the first plurality of fasteners to removably couple the first bracket assembly of the second tool bar assembly to the frame assembly, the third bar and the fourth bar are configured to directly engage a second bracket assembly of the second tool bar assembly via the second plurality of fasteners to removably couple the second bracket assembly of the second tool bar assembly to the frame assembly, and the four-bar linkage is configured to support only one tool bar assembly on the frame assembly.

2. The agricultural implement of claim 1, comprising the first tool bar assembly.

3. The agricultural implement of claim 2, wherein the first tool bar assembly comprises a central section and a plurality of wing sections.

4. The agricultural implement of claim 3, wherein the plurality of wing sections comprises a first wing section rotatably coupled to a first end of the central section, a second wing section rotatably coupled to the first wing section, a third wing section rotatably coupled to a second end of the central section, and a fourth wing section rotatably coupled to the third wing section.

5. The agricultural implement of claim 1, wherein a first length of the first tool bar assembly is different than a second length of the second tool bar assembly.

6. The agricultural implement of claim 1, wherein the four-bar linkage comprises a parallel linkage.

7. The agricultural implement of claim 1, wherein a first number of sections of the first tool bar assembly is different than a second number of sections of the second tool bar assembly.

8. The agricultural implement of claim 1, wherein the four-bar linkage is configured to move the first tool bar assembly or the second tool bar assembly up and down.

9. An agricultural implement, comprising:
a first tool bar assembly comprising a first bracket assembly, a second bracket assembly, and a tool bar, wherein the first and second bracket assemblies are coupled to the tool bar, and the first and second bracket assemblies are laterally spaced apart from one another along the tool bar; and
a frame assembly coupled to the first tool bar assembly, wherein the frame assembly comprises a mounting assembly having a four-bar linkage, the four-bar linkage comprises a first bar, a second bar, a third bar, and a fourth bar, the first bar and the second bar are laterally aligned with one another, the third bar and the fourth bar are laterally aligned with one another, the first bar and the second bar are configured to removably couple the first bracket assembly of the first tool bar assembly to the frame assembly via a first plurality of fasteners, the third bar and the fourth bar are configured to removably couple the second bracket assembly of the first tool bar assembly to the frame assembly via a second plurality of fasteners, and the frame assembly is configured to provide structural support to the first tool bar assembly;
wherein the four-bar linkage of the mounting assembly is configured to facilitate removal and replacement of the first tool bar assembly with a second tool bar assembly having a different configuration than the first tool bar assembly, the first bar and the second bar are configured to removably couple a first bracket assembly of the second tool bar assembly to the frame assembly via the first plurality of fasteners, the third bar and the fourth bar are configured to removably couple a second bracket assembly of the second tool bar assembly to the frame assembly via the second plurality of fasteners, and the four-bar linkage is configured to support only one tool bar assembly on the frame assembly.

10. The agricultural implement of claim 9, wherein a first length of the first tool bar assembly is different than a second length of the second tool bar assembly.

11. The agricultural implement of claim 9, wherein a first number of sections of the first tool bar assembly is different than a second number of sections of the second tool bar assembly.

12. The agricultural implement of claim 9, wherein the first tool bar assembly comprises a central section and a plurality of wing sections.

13. The agricultural implement of claim 12, wherein the plurality of wing sections comprises a first wing section rotatably coupled to a first end of the central section, a second wing section rotatably coupled to the first wing section, a third wing section rotatably coupled to a second end of the central section, and a fourth wing section rotatably coupled to the third wing section.

14. An agricultural implement, comprising:
a frame assembly comprising a mounting assembly having a mechanical linkage, wherein the mechanical linkage comprises a first bar, a second bar, a third bar, and a fourth bar, the first bar and the second bar are laterally aligned with one another, the third bar and the fourth bar are laterally aligned with one another, the first bar and the second bar are configured to directly engage a first bracket assembly of a first tool bar assembly via a first plurality of fasteners to removably couple the first bracket assembly of the first tool bar assembly to the frame assembly, the third bar and the fourth bar are configured to directly engage a second bracket assembly of the first tool bar assembly via a second plurality of fasteners to removably couple the second bracket assembly of the first tool bar assembly to the frame assembly, the frame assembly is configured to provide structural support to the first tool bar assembly, the mechanical linkage of the mounting assembly is configured to facilitate removal and replacement of the first tool bar assembly with a second tool bar assembly having a different configuration than the first tool bar assembly, the first bar and the second bar are configured to directly engage a first bracket assembly of the second tool bar assembly via the first plurality of fasteners to removably couple the first bracket assembly of the second tool bar assembly to the frame assembly, the third bar and the fourth bar are configured to directly engage a second bracket assembly of the second tool bar assembly via the second plurality of fasteners to removably couple the second bracket assembly of the second tool bar assembly to the frame assembly, and the mechanical linkage is configured to support only one tool bar assembly on the frame assembly.

15. The agricultural implement of claim 14, wherein the mechanical linkage comprises a four-bar linkage.

16. The agricultural implement of claim 14, comprising the first tool bar assembly, wherein the first tool bar assembly comprises a central section and a plurality of wing sections.

17. The agricultural implement of claim 16, wherein the plurality of wing sections comprises a first wing section rotatably coupled to a first end of the central section, a second wing section rotatably coupled to the first wing section, a third wing section rotatably coupled to a second end of the central section, and a fourth wing section rotatably coupled to the third wing section.

18. The agricultural implement of claim 14, wherein a first length of the first tool bar assembly is different than a second length of the second tool bar assembly.

19. The agricultural implement of claim 14, wherein a first number of sections of the first tool bar assembly is different than a second number of sections of the second tool bar assembly.

20. The agricultural implement of claim 14, wherein the mechanical linkage is configured to move the first tool bar assembly or the second tool bar assembly up and down.

* * * * *